(12) United States Patent
Kim et al.

(10) Patent No.: US 9,514,892 B2
(45) Date of Patent: Dec. 6, 2016

(54) YARN-TYPE MICRO-SUPERCAPACITOR METHOD FOR FABRICATING SAME

(71) Applicant: IUCF-HYU (INDUSTRY-UNIVERSITY COOPERATION FOUNDATION HANYANG UNIVERSITY), Seoul (KR)

(72) Inventors: Seon Jeong Kim, Seoul (KR); Shi Hyeong Kim, Seoul (KR); Min Kyoon Shin, Seoul (KR); Jae Ah Lee, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 119 days.

(21) Appl. No.: 14/369,369

(22) PCT Filed: Nov. 29, 2012

(86) PCT No.: PCT/KR2012/010230
§ 371 (c)(1),
(2) Date: Aug. 6, 2014

(87) PCT Pub. No.: WO2013/100412
PCT Pub. Date: Jul. 4, 2013

(65) Prior Publication Data
US 2014/0376158 A1 Dec. 25, 2014

(30) Foreign Application Priority Data

Dec. 28, 2011 (KR) .................. 10-2011-0144618

(51) Int. Cl.
*H01G 11/26* (2013.01)
*H01G 11/24* (2013.01)
(Continued)

(52) U.S. Cl.
CPC .............. *H01G 11/26* (2013.01); *H01G 11/04* (2013.01); *H01G 11/24* (2013.01); *H01G 11/36* (2013.01);
(Continued)

(58) Field of Classification Search
None
See application file for complete search history.

(56) References Cited

U.S. PATENT DOCUMENTS 7,623,340 B1 * 11/2009 Song .................... B82Y 30/00
361/502
2009/0117268 A1 * 5/2009 Lewis ..................... B05D 1/60
427/205

(Continued)

FOREIGN PATENT DOCUMENTS

KR 1020060015810 2/2006

OTHER PUBLICATIONS

Gao, Wei, et al., "Direct laser writing of micro-supercapacitors on hydrated graphite oxide films," Nature Nanotechnology, Aug. 2011, vol. 6, pp. 496-500.

(Continued)

*Primary Examiner* — Dion R Ferguson
(74) *Attorney, Agent, or Firm* — Oblon, McClelland, Maier & Neustadt, L.L.P.

(57) ABSTRACT

The present invention relates to a yarn-type micro-supercapacitor fabricated by twisting a hybrid nanomembrane coated with a conducting polymer on a carbon nanotube sheet. Thus, the yarn-type micro-supercapacitor has superior performance. Particularly, since a 2-ply electrode manufac- (Continued)

tured by being twisted together with a metal wire has very high power and energy density in liquid or solid electrolyte and also has superior mechanical strength and flexibility, the yarn-type micro-supercapacitor may be variously deformed—for example, bent, twisted, or woven—to maintain superior electrochemical performance.

17 Claims, 9 Drawing Sheets

(51) Int. Cl.
   *H01G 11/36* (2013.01)
   *H01G 11/04* (2013.01)
   *H01G 11/86* (2013.01)

(52) U.S. Cl.
   CPC ............... *H01G 11/86* (2013.01); *Y02E 60/13* (2013.01); *Y10T 29/417* (2015.01)

(56) References Cited

U.S. PATENT DOCUMENTS

| | | | |
|---|---|---|---|
| 2010/0065981 A1* | 3/2010 | Liao | B82Y 30/00 264/165 |
| 2010/0167053 A1 | 7/2010 | Sung et al. | |
| 2010/0193376 A1 | 8/2010 | Rius Ferrus et al. | |
| 2011/0164349 A1* | 7/2011 | Snyder | H01G 11/02 361/525 |
| 2011/0304964 A1* | 12/2011 | Fleischer | B82Y 30/00 361/679.01 |
| 2012/0164539 A1* | 6/2012 | Zhamu | H01M 4/0445 429/300 |
| 2013/0052489 A1* | 2/2013 | Zhamu | B82Y 30/00 429/50 |
| 2013/0059174 A1* | 3/2013 | Zhamu | H01M 4/583 429/50 |
| 2013/0143087 A1* | 6/2013 | Liu | H01G 11/40 429/94 |
| 2013/0162216 A1* | 6/2013 | Zhamu | H01G 11/06 320/130 |
| 2013/0213677 A1* | 8/2013 | Zhamu | B25F 5/00 173/1 |
| 2014/0287641 A1* | 9/2014 | Steiner, III | B32B 5/26 442/223 |

OTHER PUBLICATIONS

Ji, Hengxing, et al., "Swiss roll nanomembranes with controlled proton diffusion as redox micro-supercapacitors," Chem. Commun., 2010, vol. 46, pp. 3881-3883.

Pech, David, et al., "Ultrahigh-power micrometre-sized supercapacitors based on onion-like carbon," Nature Nanotechnology, Sep. 2010, vol. 5, pp. 651-654.

\* cited by examiner

YARN-TYPE MICRO-SUPERCAPACITOR METHOD FOR FABRICATING SAME

CROSS-REFERENCE TO RELATED APPLICATIONS

This application is a §371 national stage entry of International Application No. PCT/KR2012/010230, filed Nov. 29, 2012, which claims priority to South Korean Patent Application No. 10-2011-0144618 filed Dec. 28, 2011, the entire contents of which are incorporated herein by reference.

TECHNICAL FIELD

The present invention relates to a yarn micro-supercapacitor and a method for fabricating the same. More specifically, the present invention relates to a high performance yarn micro-supercapacitor fabricated by twisting a hybrid nanomembrane made of a densified carbon nanotube sheet coated with a conducting polymer, and a method for fabricating the yarn micro-supercapacitor.

BACKGROUND ART

Electrochemical capacitors, as intermediate energy storage systems between dielectric capacitors and batteries, have attracted much interest due to higher energy density than that of batteries and higher power density as compared to traditional dielectric capacitors. In particular, micro-supercapacitors are applicable as portable and lightweight power sources for miniaturized electronic devices such as micro-electromechanical systems (MEMS), micro-robots, wearable electronic textiles, and implantable medical devices.

Micro-supercapacitors can be coupled with micro-batteries or energy harvesting micro-systems to provide peak power. Generally, supercapacitor electrodes use nano- and micro-structured materials, which have the ability to permit easy access for electrolytes due to their high surface-to-volume ratios, instead of bulk materials.

There have been notable advances in the micro-supercapacitor field, which were mostly focused on enhancing energy and power densities through effective designs of different active materials, such as carbon nanotubes (CNTs), reduced graphene oxides, activated carbons, conducting polymers, and metal oxides.

For example, rolled-up structures of nanoscale-thick thin films have been utilized for energy storage systems. Schmidt et al. reported that the Swiss roll micro-supercapacitor based on $RuO_2$ with length of 300 mm and diameter of ~7 mm has the redox capacitance of ~90 F/cm³ (~2.2 mF/cm²) based on active electrodes in a three electrode system (Ji, H., Mei, Y. & Schmidt, O. G. Swiss roll nanomembranes with controlled proton diffusion as redox micro-supercapacitors. *Chem. Commun.* 46, 3881-3883 (2010)).

Micro-patterning technology has been developed for electrochemical capacitors with micro- or nano-scale thick deposition of active materials. Volumetric capacitance of ~160 $F/cm^3$ was obtained at ~2 μm thick monolithic carbide-derived carbon films in 1M sulfuric acid, and the value was higher than that of ~20 μm thick films (~100 $F/cm^3$).

Simon et al. reported that micro-supercapacitors produced by electrophoretic deposition of a several-micrometer-thick layer of onion-like carbon nanoparticles have powers per volume (~300 $W/cm^3$) that are comparable to electrolytic capacitors (Pech, D. et al. Ultrahigh-power micrometer-sized supercapacitors based on onion-like carbon. *Nat. Nanotech.* 5, 651-654 (2010)).

Ajayan et al. reported all-carbon, monolithic micro-supercapacitors with energy and power densities of ~4.5×10⁻³ $Wh/cm^3$ and ~170 $W/cm^3$ employing patterning and laser reduction of graphene oxide films (Gao, W. et al. Direct laser writing of micro-supercapacitors on hydrated graphite oxide films. *Nat. Nanotech.* 6, 496-500 (2011)).

However, most methods related to micro-patterning and rolling-up have been with MEMS technology, which is time consuming, limited in scale-up, and often causes the formation of cracks on metal substrates by deformation. Thus, there is a need to develop micro-supercapacitors that have high energy and power densities while maintaining their various shapes and energy retention performance even during deformation.

DISCLOSURE

Technical Problem

An object of the present invention is to provide a mechanically robust, lightweight, portable yarn micro-supercapacitor that is fabricated by twisting a hybrid nanomembrane.

A further object of the present invention is to provide a yarn micro-supercapacitor that has high energy and power densities, is operable in both liquid and solid electrolytes, and has outstanding performance.

Another object of the present invention is to provide a highly flexible yarn micro-supercapacitor that uses a yarn metal wire as a current collector with a very small total volume.

Still another further object of the present invention is to provide a method for fabricating the yarn micro-supercapacitors.

Technical Solution

One aspect of the present invention provides a yarn micro-supercapacitor including a twisted hybrid nanomembrane made of a carbon nanotube sheet coated with a conducting polymer.

According to one embodiment of the present invention, the hybrid nanomembrane may be formed into a layer-by-layer structure during twisting. The carbon nanotube sheet may have a monolayer structure or a multilayer structure consisting of two or more layers.

According to a further embodiment of the present invention, the conducting polymer is preferably present in an amount of 10 to 90% by weight. If the content of the conducting polymer is less than 10% by weight or exceeds 90% by weight, the yarn micro-supercapacitor may have considerably low capacitance efficiency based on the weight of the conducting polymer. According to a further embodiment of the present invention, for example, poly(3,4-ethylenedioxythiophene), polyaniline, polypyrrole, polyethylene or polythiophene may be used as the conducting polymer.

The yarn micro-supercapacitor of the present invention is operable as a capacitor in both liquid and solid electrolytes.

According to one embodiment of the present invention, the yarn fabricated by twisting the hybrid nanomembrane may have a tensile strength of 367±113 MPa and a modulus of 5.9±1.4 GPa. The micro-supercapacitor in the form of a yarn is bendable, knottable, and weavable and is thus used in a very wide variety of applications.

The present invention provides a two-ply electrode supercapacitor including a metal wire and a yarn plied with the metal wire wherein the yarn is fabricated by twisting a hybrid nanomembrane made of a carbon nanotube sheet coated with a conducting polymer. The two-ply electrode supercapacitor has improved capacitance performance as compared to the yarn micro-supercapacitor. The metal wire may be, for example, a platinum (Pt), gold (Au), nickel (Ni) or stainless steel wire. A platinum wire is preferred.

According to one embodiment of the present invention, the two-ply electrode supercapacitor has a volumetric capacitance of 70 to 150 F/cm$^3$ in a liquid electrolyte and 70 to 150 F/cm$^3$ in a solid electrolyte for a scan rate of 1 V/s. The two-ply electrode supercapacitor has a maximum energy density of 20 to 50 mWh/cm$^3$ in 1 M sulfuric acid, a power density of 2 to 8000 W/cm$^3$ in a liquid electrolyte, and a power density of 2 to 2000 W/cm$^3$ in a solid electrolyte.

Another aspect of the present invention provides a method for fabricating a yarn micro-supercapacitor, including twisting a hybrid nanomembrane made of a carbon nanotube sheet coated with a conducting polymer in a wet condition.

For example, the hybrid nanomembrane may be twisted by attaching the hybrid nanomembrane to a substrate, attaching one end of the membrane to a motor shaft, and rotating the motor shaft.

According to one embodiment of the present invention, the hybrid nanomembrane as the yarn material may be prepared by a method including: 1) dropping a small amount of a mixed solution including Fe(III)PTS, pyridine, and an alcohol over a carbon nanotube sheet and allowing the sheet to dry to evaporate the alcohol; and 2) polymerizing a monomer on the carbon nanotube sheet from which the alcohol has been evaporated, into a conducting polymer by vapor phase polymerization.

According to one embodiment of the present invention, the carbon nanotube sheet may be a densified sheet formed by evaporating alcohol from a carbon nanotube aerogel sheet. The monomer may be used, for example, an ethylenedioxythiophene (EDOT) monomer.

Advantageous Effects

The yarn micro-supercapacitor fabricated by twisting a hybrid nanomembrane has superior performance. Particularly, the two-ply electrode fabricated by plying the yarn micro-supercapacitor with a metal wire exhibits very high power and energy densities in liquid and solid electrolytes. In addition, the twisted yarn has high mechanical strength and flexibility. These advantages allow the twisted yarn to maintain its outstanding electrochemical performance even after various deformations such as bending, twisting or weaving on a flexible substrate. Therefore, it is expected that the twisted yarn would be a promising material for the future development of wearable and implantable micro-power sources.

DESCRIPTION OF DRAWINGS

FIG. 1: Process for the fabrication of yarns by twisting PEDOT/MWNT nanomembranes according to one embodiment of the present invention and morphology of the twisted yarns. a is a schematic diagram showing a process for the fabrication of a twisted yarn, b is an AFM image of a porous nanomembrane made of aligned PEDOT/MWNTs, c shows images showing a process in which a transparent PEDOT/MWNT nanomembrane is twisted on a glass substrate, d is a higher magnification optical microscopy image of a portion where a nanomembrane is twist spun into a yarn, e shows SEM images of a yarn with ~37° bias angle, the insets showing higher magnification cross-sectional and surface images of the yarn, f is a higher magnification cross-sectional image showing a layer-by-layer structure formed within a twisted yarn, g shows two-ply yarns, h shows a knotted twisted yarn, and i is a SEM image of a braided structure. The twisted yarns had an average thickness of ~100 nm and were fabricated from the nanomembranes containing 75 wt % PEDOT.

FIG. 2: Images of a twisted yarn micro-supercapacitor before dipping in solid and liquid electrolytes and graphs showing the electrochemical capacitance performance of micro-supercapacitors in solid and liquid electrolytes. a shows a SEM image of a two-ply electrode for use as a current collecting device, which was fabricated by plying a twisted PEDOT/MWNT yarn with a platinum (Pt) wire (diameter 25 μm) as a current collector (top), and a higher magnification SEM image of the two-ply electrode (bottom), b and c show CV curves of a two-ply electrode supercapacitor (yarn diameter: 20 μm) measured at various scan rates in liquid and solid electrolytes, respectively, d and e are graphs showing changes in the volumetric and areal capacitance of a two-ply electrode supercapacitor (yarn diameter: 2.0 μm) at scan rates of up to 100 V/s and 20 V/s in liquid and solid electrolytes, respectively, and f is a graph showing changes in the volumetric capacitance (for a scan rate of 1 V/s) of a two-ply electrode supercapacitor depending on yarn diameter.

FIG. 3: Graphs showing the electrochemical properties related to peak power and cyclic stability of twisted yarn micro-supercapacitors. a shows discharge curves of a two-ply electrode supercapacitor as a function of scan rate, the curves showing the linear dependence of discharge current on scan rate, b and c show frequency dependence of the real and imaginary parts (C' and C") of the volumetric capacitance of a two-ply electrode supercapacitor in liquid and solid electrolytes, respectively, the extremely low relaxation time constants ($\tau_0$) obtained in liquid (17 ms) and solid (80 ms) electrolytes showing rapid accessibility of ions for electroadsorption, d shows Nyquist plots for two-ply electrode supercapacitors showing the real and imaginary parts of impedance (Inset: magnified diagram for high frequencies), and e shows capacitance versus cycle number for a two-ply electrode supercapacitor in liquid and solid electrolytes at a scan rate of 1 V/s.

BEST MODE

The present invention will now be described in detail.

Figure 1:
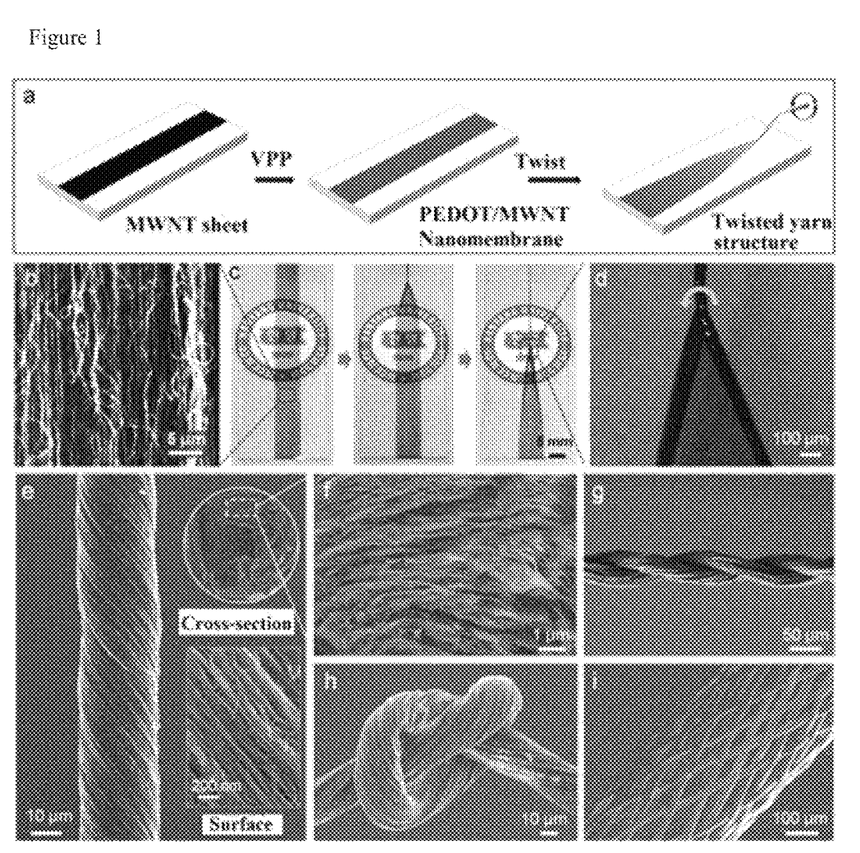

A process for the fabrication of a yarn by twisting a conducting polymer/MWNT nanomembrane is proposed in FIG. 1a. The nanomembrane was prepared by vapor phase polymerization (VPP), which enabled uniform coating of the conducting polymer layer on a substrate. Specifically, highly electrically conductive (max. ~1,000 S/cm), stable poly(3,4-ethylenedioxythiophene) (PEDOT) was used as a capacitor material. Densified two-layer CNT sheets (CNSs, thickness: 75±42 nm) consisting of well-aligned MWNTs (diameter: ~10 nm) were used as host matrices. After VPP coating, a nanoscale-thick membrane including aligned PEDOT/MWNTs was prepared (FIG. 1b).

The thickness of the nanomembrane was controlled by varying the kind of an oxidant used and was measured by atomic force microscopy (AFM).

Figure 5:
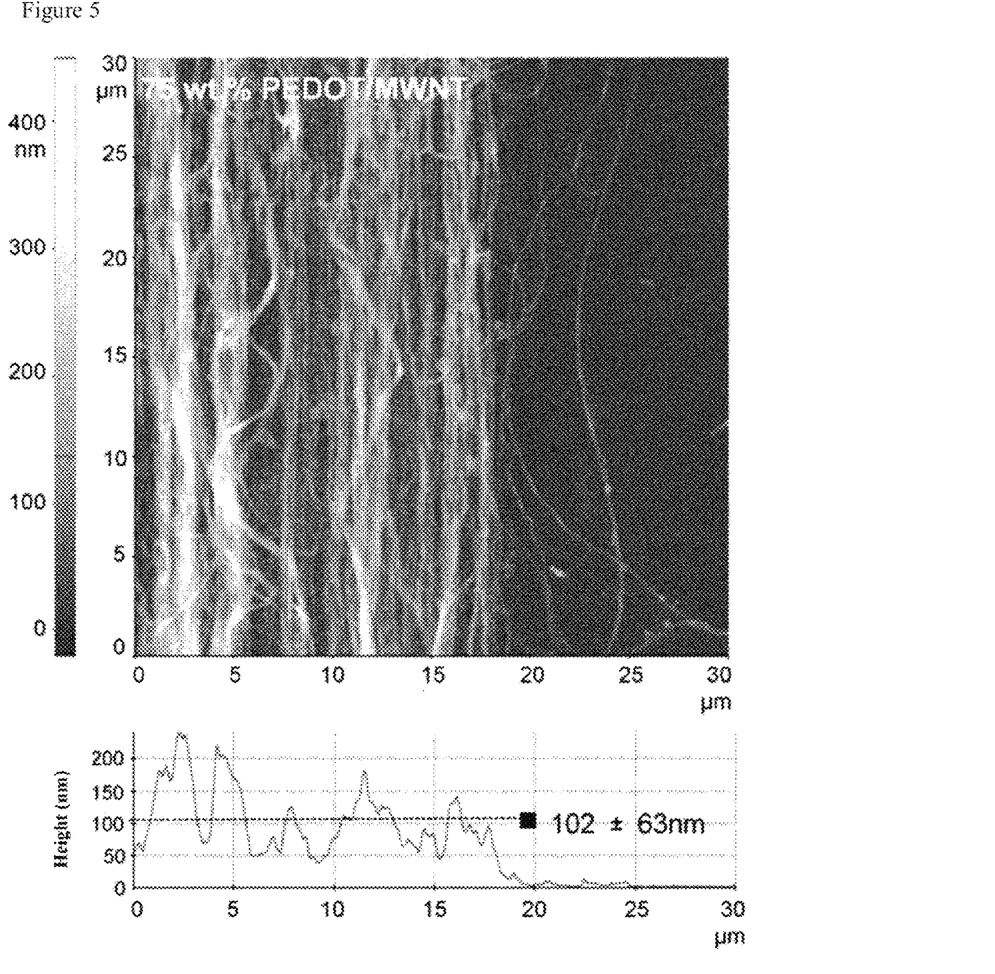
FIG. 5: AFM image showing the topography and height profile for a PEDOT/MWNT nanomembrane containing 75 wt % PEDOT.

The average thickness of the PEDOT/MWNT nanomembrane containing 75 wt % PEDOT was ~102 nm (FIG. 5). The PEDOT/MWNT nanomembrane attached to the glass substrate was twisted using an electric motor in a wet condition (an ethanol/water solution was used as the wet solution) (FIG. 1c). An edge structure of the nanomembrane twist spun into a yarn (FIG. 1d) shows a more sophisticated spiral structure than simple Archimedean and Fermat spirals. However, the yarn had a constant yarn bias angle α between ~25° and ~40°, which is the angle between the yarn direction and the orientation direction of helically wrapped nanotubes on the outer yarn surface. The bias angle α of the uniform yarn can be controlled by varying the number of turns. For supercapacitor evaluations, twisted yarns having a bias angle of ~30° were used.

The turns per meter needed to obtain this bias angle for a twisted yarn is ~tan α/pD (D is the yarn diameter, α is the bias angle, and p is π). Accordingly, for a twisted yarn made of a 75 wt % PEDOT/MWNT nanomembrane, the turns per meter is 9189 turns/m (D: 20 μm, α: 30°).

When a two-layer carbon nanotube sheet was coated with PEDOT as a conducting polymer using an 8 wt % oxidant solution, the PEDOT content was 75 wt % based on the carbon nanotubes and the average thickness of the nanomembrane was 102 nm (FIG. 5).

The outer surface of the yarn had a structure in which the carbon nanotubes were individually coated with the PEDOT conducting polymer. This structure was large in surface area and had nano-sized pores. The cross-section of the yarn had a layer-by-layer structure in which nanoscale-thick membrane layers were scrolled (FIGS. 1e and 1f).

The mechanical strength and modulus of the 75 wt % PEDOT-coated yarn were ~367 MPa (average) and ~5.9 GPa (average) (FIG. 6), respectively. The high mechanical strength and useful modulus made the yarns knottable or enabled fabrication of two-ply or braided yarn structures (FIGS. 1g, 1h, and 1i).

Figure 2:
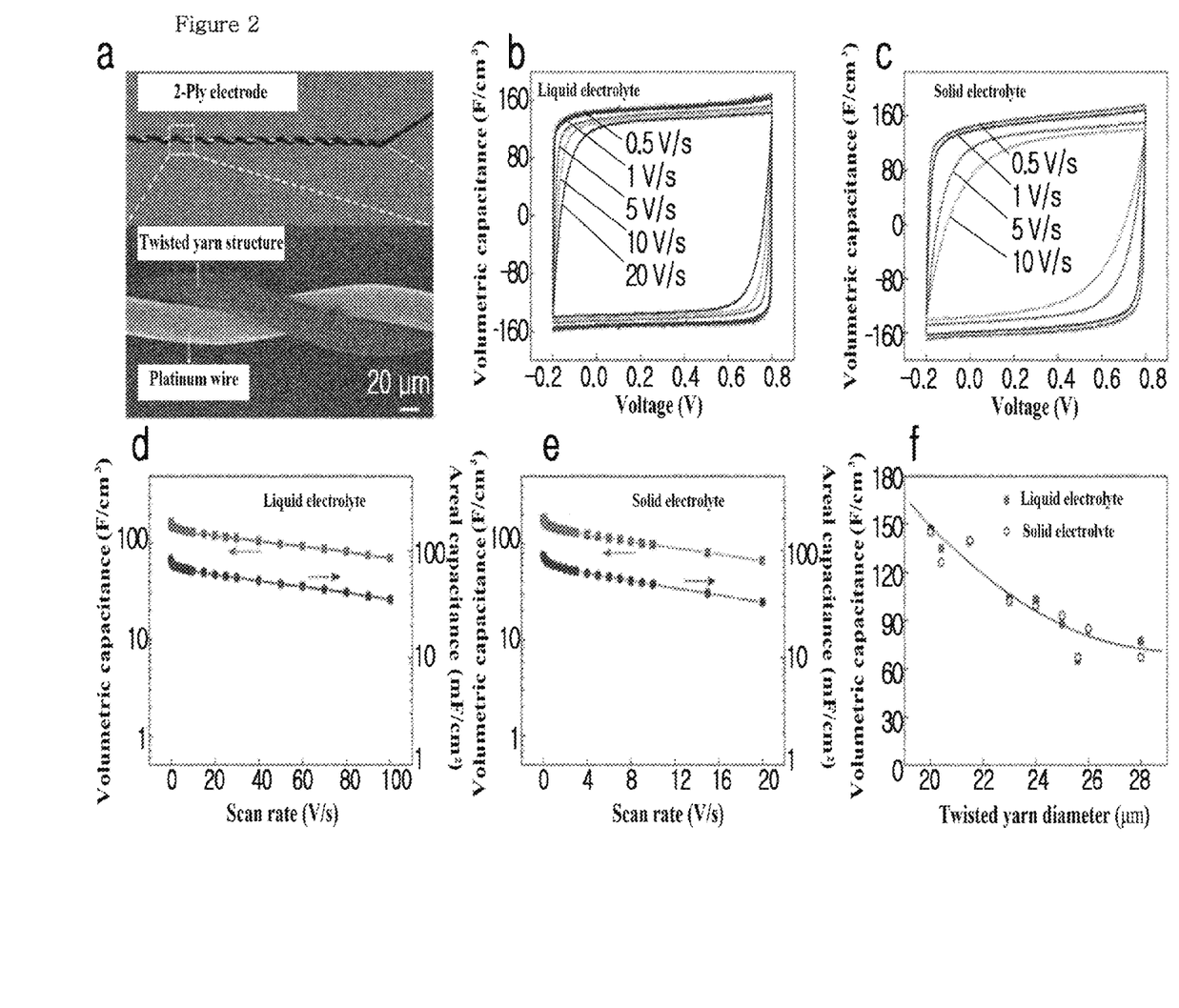

For electrochemical characterization of the yarn supercapacitors, a platinum wire (thickness: 25 μm) acting as a current collector was plied with the yarn (diameter: 26 μm) to prepare a two-ply electrode (FIG. 2a). At voltages of −0.2 to 0.8 V, the yarn supercapacitor containing 75 wt % PEDOT maintained rectangular shapes of cyclic voltammograms (CVs) up to 20 V/s (20,000 mV/s) and 5 V/s (5,000 mV/s) in 1 M sulfuric acid and solid electrolytes, respectively, due to fast charge/discharge rates at the interface between the conducting polymer (FIGS. 2b and 2c).

Figure 3:
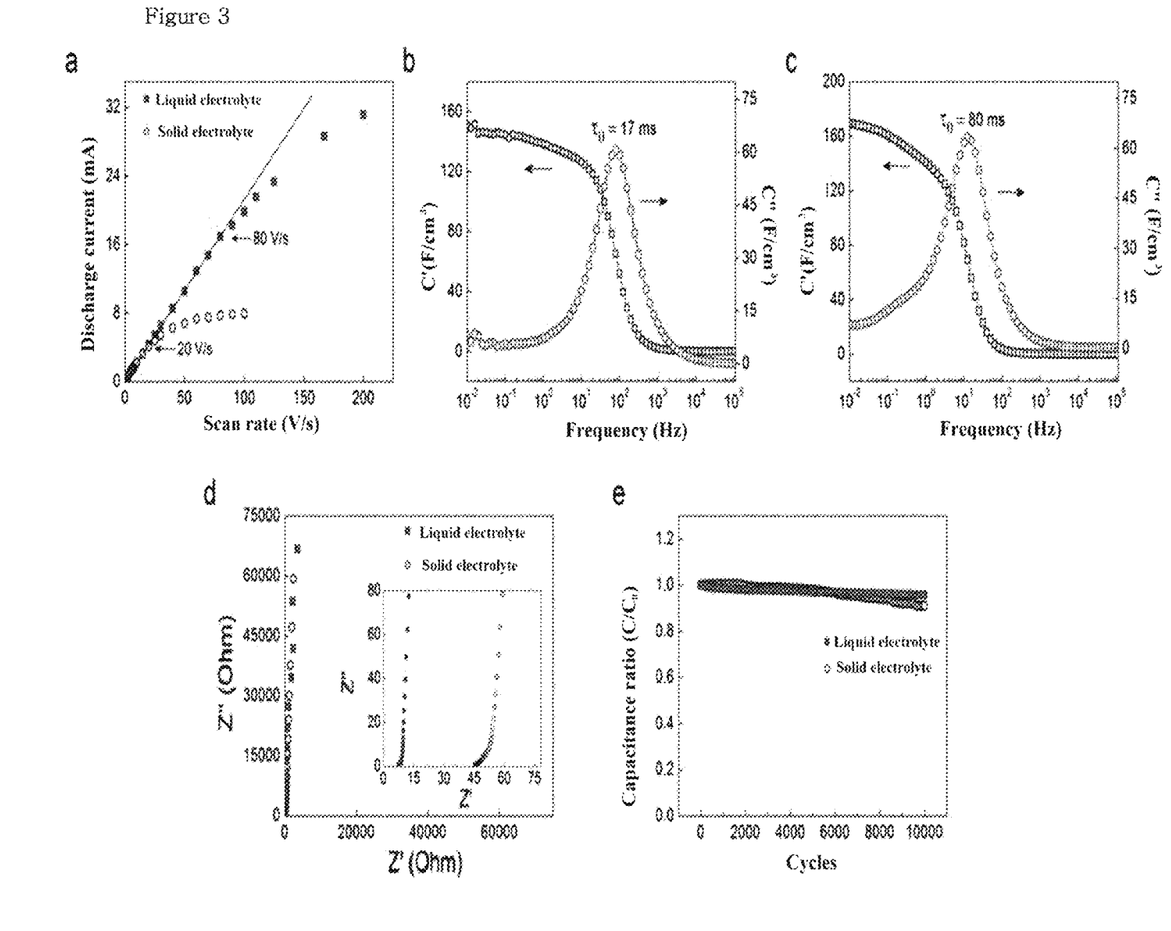

The linear dependencies of discharge current on scan rate were shown at up to ~80 V/s and up to ~20 V/s in liquid and solid electrolytes, respectively, reflecting the capacitance retention of the yarn supercapacitors even at high scan rates (FIG. 3a).

In the Nyquist graphs obtained by plotting the imaginary and real parts of capacitance, the relaxation time constants ($\tau_0$) of the supercapacitor are 17 ms in the liquid electrolyte and 80 ms in the solid electrolyte. These results imply that the capacitance of the supercapacitor was better retained without significant reduction even at high scan rates in the liquid electrolyte than in the solid electrolyte (FIGS. 3b and 3c). The capacitances of the yarn were well maintained even at high scan rates in the liquid/solid electrolytes. The volumetric capacitance values of the yarn were 150 F/cm$^3$ and 153 F/cm$^3$ at 500 mV/s and 137 F/cm$^3$ and 117 F/cm$^3$ at 5 V/s in the liquid and solid electrolytes, respectively (FIGS. 2d and 2e).

The capacitance retention ability of the supercapacitor in the liquid electrolyte was superior to that in the solid electrolyte. This can be explained by a much lower equivalent series resistance (ESR) value of 37 ohm (at 1 kHz) in the liquid electrolyte than 107 ohm (at 1 kHz) in the solid electrolyte in the Nyquist plots of FIG. 3d. The capacitance value increased with decreasing yarn diameter (FIG. 2f). The capacitance decrease was ~10% in the solid electrolyte during 10,000 cycles at 1 V/s, indicating high CV stability of the yarn (FIG. 3e).

When the yarn supercapacitor fixed to the substrate was bent, no significant reduction in capacitance was observed. Even when the yarn supercapacitor attached in a sinusoidal configuration to the substrate was stretched to an elongation of 100%, it did not undergo a significant reduction in capacitance.

Figure 4:
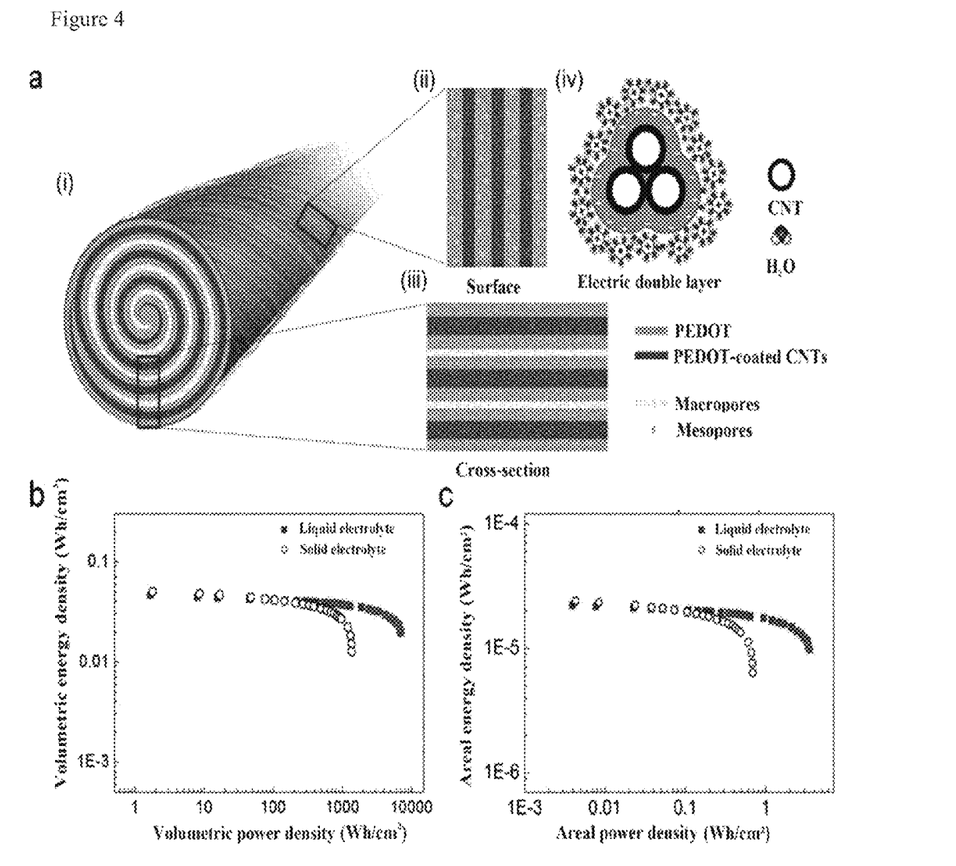
FIG. 4: Schematic diagram of a porous model of a twisted yarn micro-supercapacitor and graphs showing the energy and power densities of the twisted yarn micro-supercapacitor. a shows a porous structure and an electric double layer model of a twisted yarn supercapacitor, and b and c show Ragone plots of volumetric and areal energy and power densities of two-ply electrode micro-supercapacitors (yarn diameter: 20 μm) in liquid and solid electrolytes, respectively.

The energy densities (46 mWh/cm$^3$ and 50 mWh/cm$^3$ in the liquid and solid electrolytes, respectively) and power densities (7012 W/cm$^3$ and 1370 W/cm$^3$ in the liquid and solid electrolytes, respectively) of the yarn supercapacitor were higher than those of other previous micro-supercapacitors (FIG. 4).

Mode for Invention

The present invention will be explained in more detail with reference to the following examples. However, these examples are provided to assist in understanding the invention and are not intended to limit the scope of the present invention.

Example 1

Preparation of Hybrid Nanomembranes

A 20 wt % Fe(III)PTS/butanol solution was used as an oxidizing agent. Pyridine (1.6 vol %) was added to the 20 wt % Fe(III)PTS/butanol solution. The Fe(III)PTS/pyridine/butanol solution containing from 8 to 16 wt % of the oxidant was made by diluting the stock solution containing 20 wt % oxidant in butanol. The diluted solutions (70 μL tier 75 mm×7 mm CNSs) were dropped over two-layer carbon nanotube aerogel sheets. The carbon nanotube aerogel sheets were allowed to dry at 60° C. for 20 min to evaporate the butanol. Densified CNSs with a thickness of ~50 nm were subsequently obtained. The EDOT monomer was cast on both sides of the densified CNSs in a VPP chamber, and then the samples were exposed to EDOT vapor at 60° C. for 1 h. After the VPP, the PEDOT-coated CNSs were rinsed three times with deionized water.

Example 2

Fabrication of Yarn Supercapacitors by Twisting the Hybrid Nanomembranes

In this example, the hybrid nanomembranes were twisted into strong and flexible yarns with ~20 to ~35 μm diameter using electric motor devices. The resulting yarn diameter varies depending on the width and diameter of the hybrid nanomembrane. Details of the process for fabricating yarns by twisting the hybrid nanomembranes prepared by VPP on glass substrates are as follows.

First, one end of the hybrid nanomembrane was peeled from a glass substrate in an ethanol/water solution and attached on an electric motor shaft with a flat rectangular paddle. Then, the opposite end of the hybrid nanomembrane was well attached to the glass substrate. Then, the ~6.5 cm long nanomembrane was slowly twisted using the motor. The number of rotations of the motor was ~400. Both ends of the twisted yarn were fixed to the glass substrate using carbon tape and the twisted yarn was dried at room temperature. The twisted PEDOT/MWNT yarn was plied with an ~25 μm diameter platinum (Pt) wire using the electric motor to make a two-ply electrode for a supercapacitor.

Experimental Example 1

Characterization of the Yarn Micro-Supercapacitors

Figure 6:
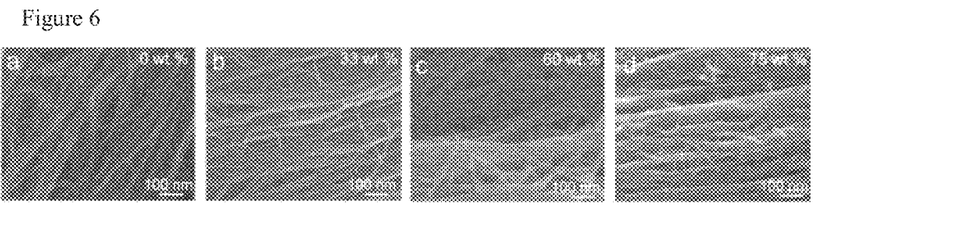
FIG. 6: SEM images showing changes in the surface of yarns with increasing concentration of PEDOT in solutions. As the PEDOT concentration increased, the pore size of the yarn surface decreased gradually.

The twisting technique employed in the present invention generates high compressive forces during yarn fabrication, unlike previous simple winding techniques for forming hollow tube structures. As a result, compact PEDOT/MWNT multilayer structures having a nanoscale porosity were formed within the twisted yarn (FIGS. 1e and 1f). The surface porosity of the twisted yarn was found to decrease approximately proportionately with increase of PEDOT content (FIG. 6). The high mechanical strength and flexibility of the twisted yarns represent that they are knottable and can be easily fabricated into two-ply yarns and 32-yarn braids despite the high content (75 wt %) of the conducting polymer (FIGS. 1g-1i), unlike common brittle conducting polymers or composite fibers.

Figure 7:
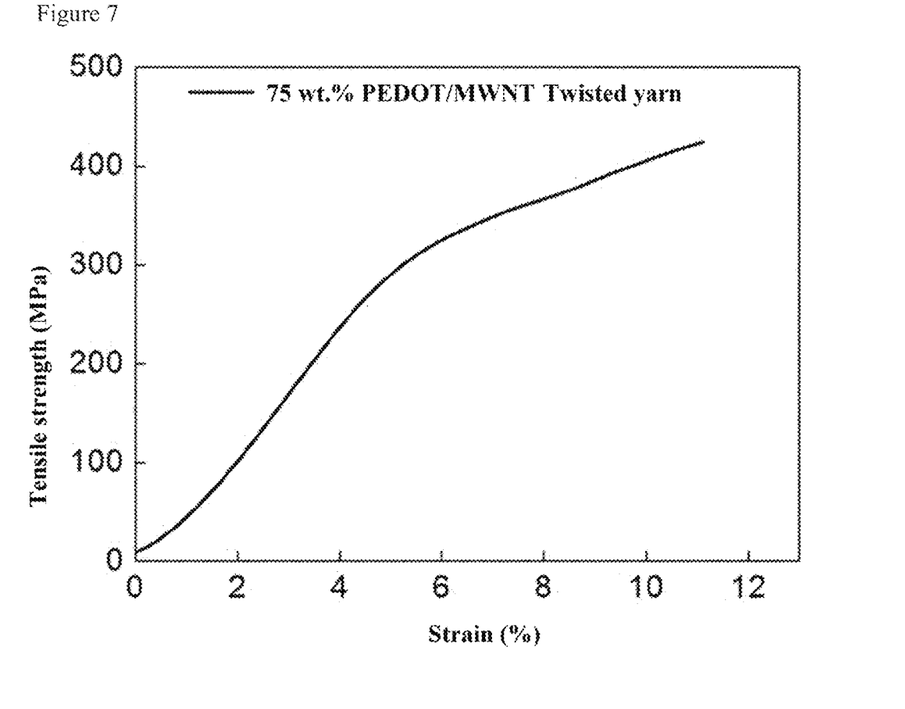
FIG. 7: Tensile strength-strain curve for a twisted PEDOT/MWNT yarn containing 75 wt % PEDOT.

The tensile strength and modulus of the yarn consisting of 75 wt % PEDOT and CNS were 367.3±113 MPa and 5.9±1.4 GPa, respectively. The average strength of the yarn was higher than that (150-300 MPa) of yarns consisting of MWNTs. The mechanical strength of the twisted yarn decreased with increasing PEDOT content (FIG. 7).

The electrochemical performance of the yarn micro-supercapacitors was evaluated using cyclic voltammetry (CV) and electrochemical impedance spectroscopy (EIS). All measurements were conducted under a symmetric two-electrode system with liquid (1 M sulfuric acid) and solid (PVA/sulfuric acid) electrolytes using electrochemical analyzers (CHI627B from CHI Instrument and Reference 600 from Gamry Instrument, USA).

30 ml of water and 1.67 ml of 1 M sulfuric acid were mixed with stirring for 10 min in a 50 ml glass bottle. 3 grams of PVA ($M_w$ 146,000-186,000) was added to the solution, and then the mixture was stirred for 1 h at ~90° C. to prepare the solid electrolyte.

The twisted PEDOT/MWNT yarn was plied with a platinum wire (diameter: 25 μm) without any binder to fabricate identical two-ply electrodes (FIG. 2a). The two-ply electrodes were used as both anode and cathode for a symmetric supercapacitor without an additional reference electrode.

The two-ply electrode micro-supercapacitor showed rectangular cyclic voltammograms (CVs) even at high scan rates of up to ~20 V/s and ~5 V/s (FIGS. 2b and 2c) in liquid and solid electrolytes, respectively. The rectangular CV shape represents that the yarn supercapacitor of the present invention possesses capacitor performance at ultrahigh charge/discharge rates and are operable, like electric double layer capacitors.

FIGS. 2d and 2e show volumetric and areal capacitances obtained at different scan rates. The capacitances of the two-ply electrode supercapacitor consisting of the twisted yarn (yarn diameter: ~20 mm) and the platinum wire normalized with respect to the total volume of the active material (the twisted PEDOT/MWNT yarn) were ~147 F/cm$^3$ (liquid electrolyte) and 145 F/cm$^3$ (solid electrolyte) at 1 V/s.

The capacitances were about ~129 F/cm$^3$ (liquid electrolyte) and ~97 F/cm$^3$ (solid electrolyte) at a higher scan rate of 10 V/s. Even when different kinds of electrolyte were used, the volumetric capacitances of the yarn supercapacitor were at least an order of magnitude higher than those of carbon-based micro-supercapacitors using nanoscale-thick active materials (1.3 F/cm$^3$ at 1 V/s for onion-like carbon, 9 F/cm$^3$ at 1 V/s for activated carbon, and 3.1 F/cm$^3$ at 0.04 V/s for graphite oxide film).

The capacitance performance of the yarn supercapacitor according to the present invention measured in the solid electrolyte was superior to that of conducting polymer-based micro-supercapacitors.

As recent high-performance solid-state supercapacitors are made of nanometer-thick active materials on substrates, normalization based on area was used to provide fair performance comparisons.

It was reported that polypyrrole-decorated nanoporous gold membrane supercapacitors with a thickness of ~100 nm (HClO$_4$/PVA gel electrolyte) had an areal capacitance of 1.8 mF/cm$^2$ at 0.1 V/s. It is also known that polyaniline nanowire micro-supercapacitors with a thickness of ~400 nm (H$_2$SO$_4$PVA gel electrolyte) had a capacitance of 23.5 mF/cm$^2$ at 0.1 mA/cm$^2$.

The two-ply electrode supercapacitor of the present invention has a capacitance of 73 mF/cm$^2$ at 1 V/s that is at least three times higher than for the previously described conducting polymer-based nanoscale supercapacitors.

FIG. 2f shows the dependence of volumetric capacitance on yarn diameter at 1 V/s. The yarn diameter can be controlled by the hybrid nanomembrane width. The hybrid nanomembranes were prepared under identical VPP conditions and consisted of 75 wt % PEDOT. The volumetric capacitance measured for the two-ply electrode supercapacitor showed a tendency to increase with increasing yarn diameter. The decreased capacitance for the thicker yarn seems to be attributed to be ion diffusion distance effects and decreased contact pressure between the twisted yarn and the metal wire.

Hertzian contact pressure theory for cylindrical yarns held in parallel or in diagonal contact with metal wires of constant diameter, predicts lower contact pressure for large diameter yarns for the same contact force conditions. Decreased contact pressure can generate increased contact resistance, thereby resulting in an increase of the ESR. When a yarn with a larger diameter is used, a larger number of ions need to migrate into a porous structure from a bulk electrolyte. Accordingly, decreased contact pressure and increased yarn diameter increase the possibility that volumetric capacitances may be lowered, particularly at high discharge/discharge rates.

The obtained discharge current linearly increases as a function of scan rate up to ~80 and ~20 V/s for liquid and solid electrolytes, respectively (FIG. 3a). This behavior was similar to that of a high-performance onion-like carbon supercapacitor (film thickness: ~7 mm) (~100 V/s) measured in 1 M $Et_4NBF_4$/anhydrous propylene carbonate and was superior to that of an activated carbon supercapacitor (film thickness: ~7 μm) measured in the same electrolyte (~1 V/s). This linear relationship decreased in the solid electrolyte system, probably because the electrical contact between the twisted yarn and the metal wire is partially impeded by PVA.

The discharge efficiency of the two-ply electrode supercapacitor can be calculated from the relaxation time constant ($\tau_0$), which is very low (17 ms) for the yarn supercapacitor (diameter: 20 μm) of the present invention in the water-soluble electrolyte. This value is smaller than that for the onion-like carbon (26 ms) and activated carbon (700 ms) supercapacitors. The time constant for solid-electrolyte yarn supercapacitors was significantly longer, which can be explained by an increased ESR due to the presence of PVA, as shown in FIG. 3d.

Figure 8:
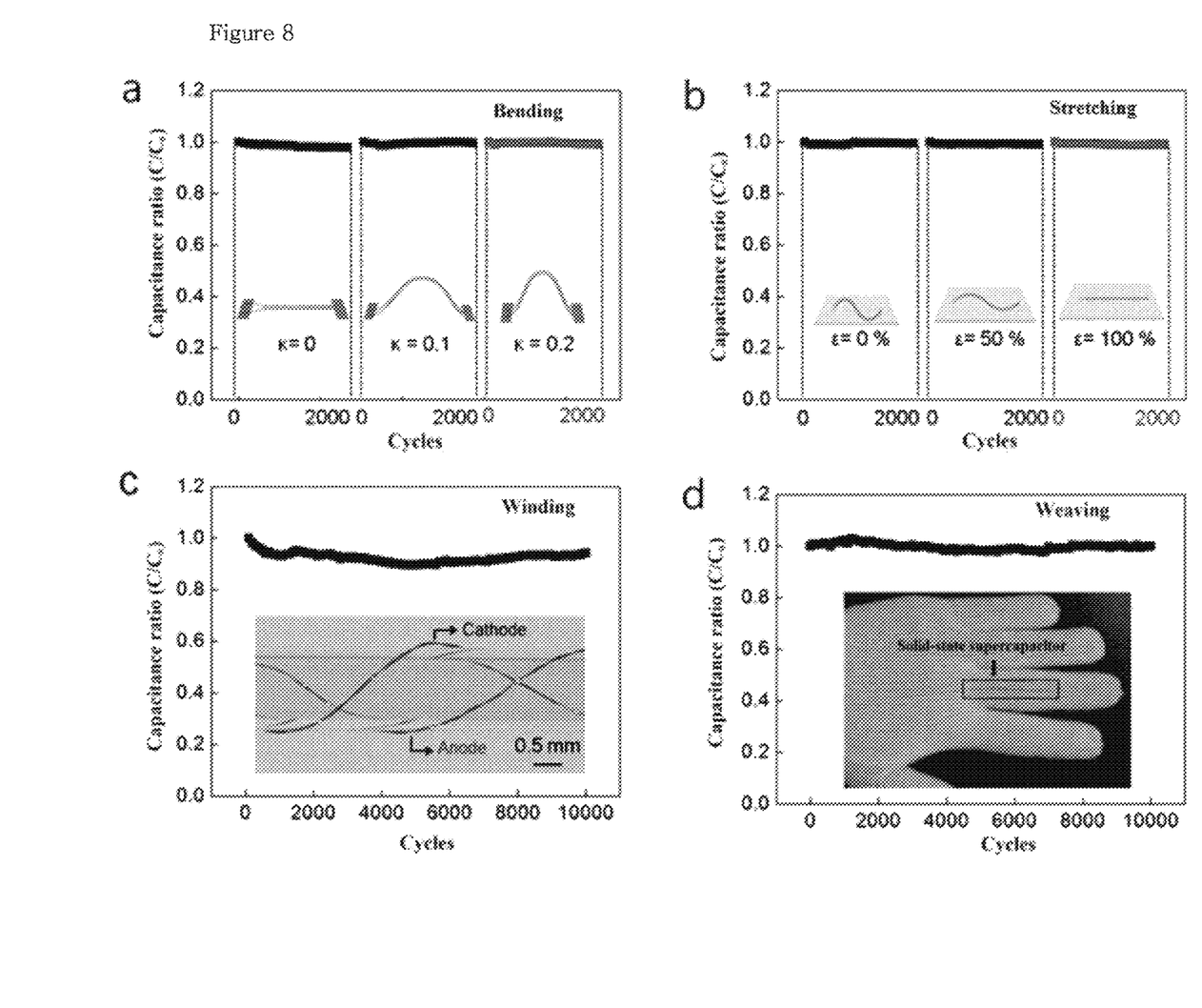
FIG. 8: Graphs showing changes in the capacitance stability versus cycle number for two-ply supercapacitors under various configurations: a bending (a wavy 2-ply electrode was attached to a rubber substrate), b stretching, c winding on a 1.4 mm diameter glass tube, and d weaving into a glove. k and e are curvature and strain, respectively.

The two-ply yarn supercapacitor showed stable cycling performance and its capacitance decreases were ~5% and ~10% for 10,000 cycles in the liquid and solid electrolytes, respectively. All-solid-state two-ply electrode supercapacitors underwent only slight changes in capacitance and were tested under various configurations: bending (~2% for 2000 cycles), stretching (~1% for 2000 cycles, the wavy two-ply yarn was attached to a rubber substrate), winding (~10% for 10,000 cycles), and weaving (~1% for 10,000 cycles) (FIG. 8).

Figure 9:
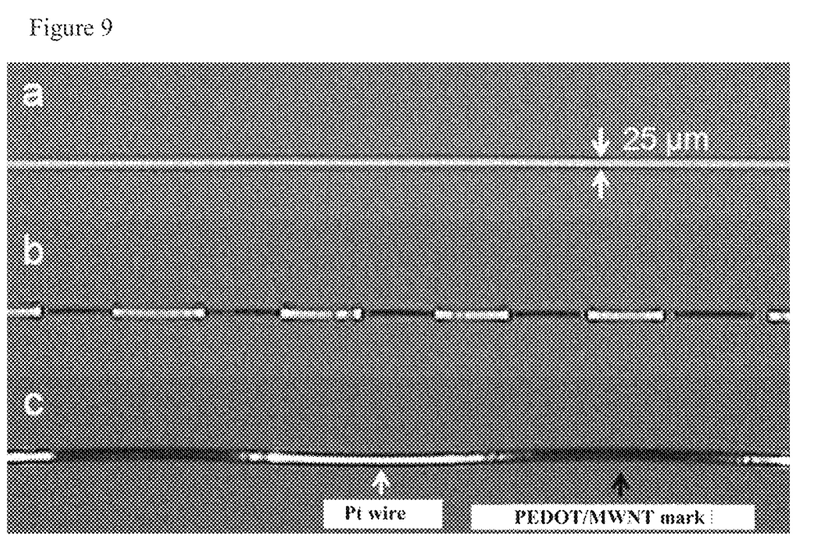
FIG. 9: a is an optical microscopy image of a 25 μm diameter platinum (Pt) wire, b is an optical microscopy image of a platinum (Pt) wire without a twisted PEDOT/MWNT yarn after untwisting of a two-ply electrode fabricated by plying the twisted yarn with the platinum (Pt) wire, the remaining black marks representing strong contact between the yarn and the platinum wire by compressive forces generated during plying, and c is a higher magnification optical microscopy image of b.
Figure 10:
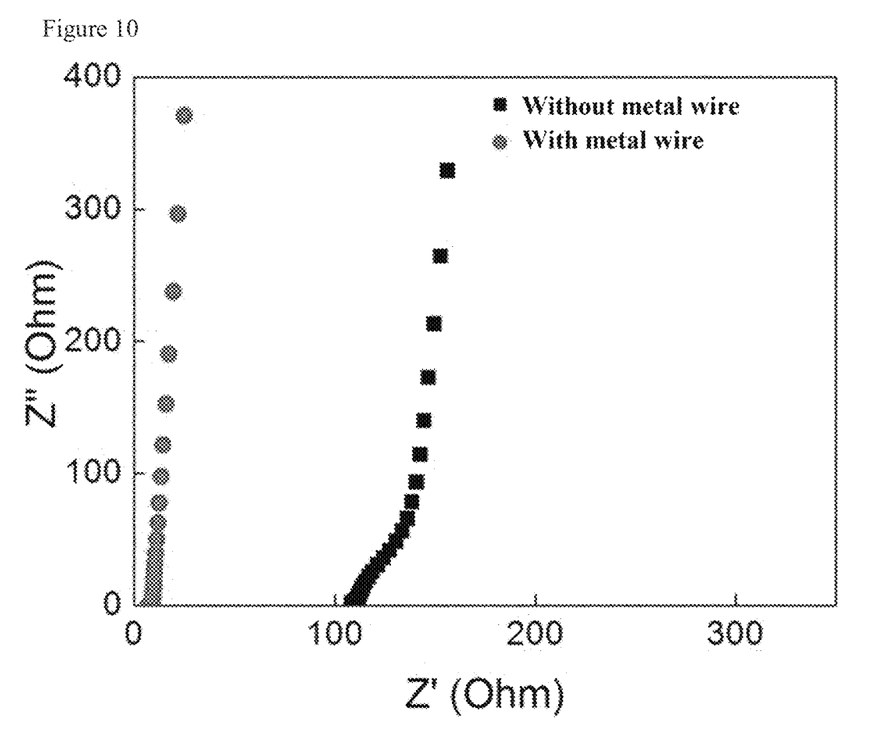
FIG. 10: Nyquist plots for a twisted PEDOT/MWNT yarn with a metal wire and a twisted PEDOT/MWNT yarn without a metal wire in the high frequency range.

Capacitances obtained at scan rates for a yarn supercapacitor fabricated by plying a twisted yarn with a metal wire are attributed to the binding between the active material (twisted yarn) and the current collector (Pt wire) (FIG. 9). The strong physical contact caused by compressive forces generated during plying results in a low ESR. The ESR measured dramatically decreased from 166 Ohm (at 1 kHz) to 38 Ohm (at 1 kHz) in a two-electrode system with a metal wire and a two-electrode system without a metal wire, and the radius of the Nyquist semi-circle related to the decrease of charge transfer resistance also decreased. This represents fast electron and charge transfer between the twisted yarn and the platinum wire (FIG. 10).

Figure 11:
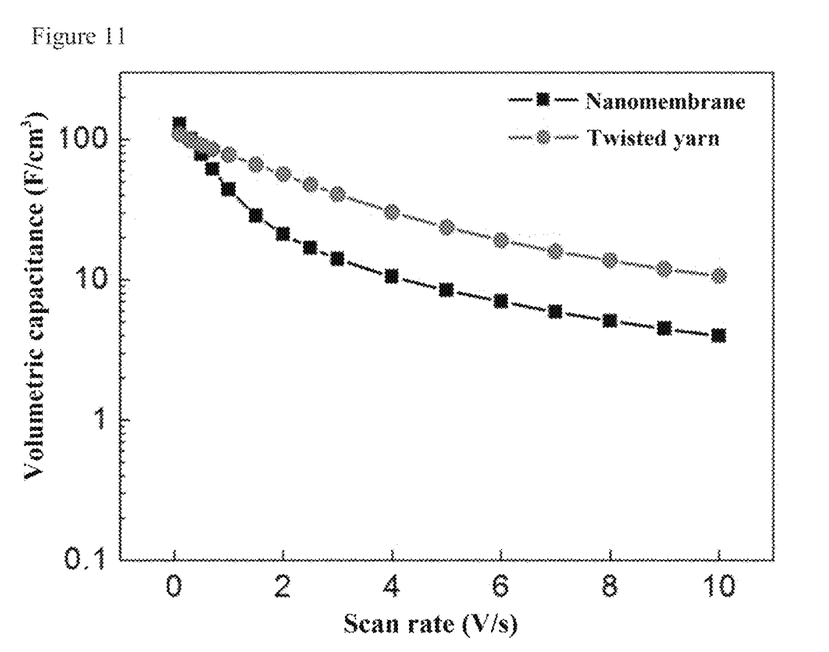
FIG. 11: Graphs showing changes in the volumetric capacitance of a nanomembrane and a twisted yarn supercapacitor measured at scan rates of 0.1 to 10 V/s in 1 M $H_2SO_4$. Experiments were made using a three-electrode system and all samples were used as working electrodes without metal current collectors.

The fabrication process of the present invention enables effective binding and arrangement of CNTs and PEDOT (FIG. 3a). Due to their high electrical conductivity (~530 S·cm²/g), MWNTs are connected to PEDOT and are then aligned during twisting to deliver outstanding electrochemical performance, as shown in FIG. 11.

The present inventors believe that the decreased capacitance of the twisted yarn is closely related to the presence of both macroporous (>50 nm) and mesoporous (2-50 nm) structures within the yarn (FIG. 1f). The reason for this is that there is always a conflict between specific surface area (to ensure high capacitance) and pore size distribution (to permit accessibility for electrolyte). Generally, mesoporous (between 2 nm and 50 nm) or microporous (less than 2 nm) materials often undergo a capacitance decrease at high scan rates (or high current density emission) due to the limited ion transfer within a network of the internal pores. Particularly, the decreased capacitance is more distinct for microporous materials where the removal of ionic solvents may occur in connection with an increased ESR. However, macroporosity of the layer-by-layer nanomembrane in the twisted yarn can accelerate the diffusion of solute into or out of the yarn during charge/discharge. Although the mesoporous membrane layer may cause a decrease in capacitance at high scan rates, the nanoscale-thick layer can effectively prevent a dramatic decrease in capacitance due to the introduction of short diffusion distances. Accordingly, two-ply yarns fabricated by plying twisted yarns of ultrathin PEDOT/MWNT layers with metal wires can establish the basis for supercapacitors with high power and energy densities.

In addition, high energy and power densities of twisted yarn supercapacitors are proposed in the Ragone plots of FIGS. 4b and 4c. The two-ply electrode supercapacitors (twisted yarn diameter: 20 mm) have a maximum energy density of 46 mWh/cm³ (46 Wh/liter in the common unit) in 1M $H_2SO_4$ and a power density of 7013 W/cm³ (~7×10⁶ W/liter), which are higher than the volumetric energy density (~1.5 mWh/cm³) and power density (~300 W/cm³) of onion-like carbon supercapacitors comparable to those of electrolytic capacitors.

In addition, the performance of the yarn supercapacitor according to the present invention measured in the solid electrolyte was by far superior to that of all-solid-state conducting polymer-based micro-supercapacitors having nanoscale-thick active layers on substrates. The areal energy density (0.42 W/cm²) of the yarn supercapacitor according to the present invention was at least 8 times higher than that of a polyaniline nanowire micro-supercapacitor (areal energy density: $2.5E^5$ Wh/cm²) with a 400 nm thick active material (0.05 W/cm²).

INDUSTRIAL APPLICABILITY

The twisted yarn of the present invention has high mechanical strength and flexibility. These advantages allow the twisted yarn to maintain its outstanding electrochemical performance even after various deformations such as bending, twisting or weaving on a flexible substrate. Therefore, it is expected that the twisted yarn of the present invention would be a promising material for the future development of wearable and implantable micro-power sources.

The invention claimed is:
1. A yarn micro-supercapacitor comprising a twisted hybrid nanomembrane made of a carbon nanotube sheet coated with a conducting polymer, wherein a cross-section of the yarn micro-supercapacitor has a layer-by-layer structure in which layers of the carbon nanotube sheet and layers of the conducting polymer are alternately stacked on each other.

2. The yarn micro-supercapacitor according to claim 1, wherein the hybrid nanomembrane is formed into a layer-by-layer structure during twisting.

3. The yarn micro-supercapacitor according to claim 1, wherein the carbon nanotube sheet has a monolayer structure or a multilayer structure consisting of two or more layers.

4. The yarn micro-supercapacitor according to claim 1, wherein the conducting polymer is present in an amount of 10 to 90% by weight.

5. The yarn micro-supercapacitor according to claim 1, wherein the conducting polymer is selected from poly (3, 4-ethylenedioxythiophene), polyaniline, polypyrrole, polyethylene, and polythiophene.

6. The yarn micro-supercapacitor according to claim 1, wherein the yarn micro-supercapacitor is operable as a capacitor in a liquid or solid electrolyte.

7. The yarn micro-supercapacitor according to claim 1, wherein the yarn has a tensile strength of 367±113 MPa and a modulus 5.9±1.4 GPa.

8. The yarn micro-supercapacitor according to claim 1, therein the yarn micro-supercapacitor is bendable, knottable, and weavable.

9. A two-ply electrode supercapacitor comprising a metal wire and a yarn plied with the metal wire, wherein
the yarn is fabricated by twisting a hybrid nanomembrane made of a carbon nanotube sheet coated with a conducting polymer, and
a cross-section of the yarn has a layer-by-layer structure in which layers of the carbon nanotube sheet and layers of the conducting polymer are alternately stacked on each other.

10. The two-ply electrode supercapacitor according to claim 9, wherein the metal wire is a platinum (Pt), gold (Au) or aluminum (Al) wire.

11. The two-ply electrode supercapacitor according to claim 10, wherein the two-ply electrode supercapacitor has a volumetric capacitance of 70 to 150 $F/cm^3$ in a liquid electrolyte and 70 to 150 $F/cm^3$ in a solid electrolyte for a scan rate of 1 V/s.

12. The two-ply electrode supercapacitor according to claim 10, wherein the two-ply electrode supercapacitor has a maximum energy density of 20 to 50 $mWh/cm^3$ in 1 M sulfuric acid.

13. The two-ply electrode supercapacitor according to claim 10, wherein the two-ply electrode supercapacitor has a power density of 2 to 8000 $W/cm^3$ in a liquid electrolyte and 2 to 2000 $W/cm^3$ in a solid electrolyte.

14. A method for fabricating a yarn micro-supercapacitor, comprising:
twisting a hybrid nanomembrane made of a carbon nanotube sheet coated with a conducting polymer in a wet condition;
dropping a mixed solution comprising Fe(III)PTS, pyridine, and an alcohol over the carbon nanotube sheet and allowing the carbon nanotube sheet to dry to evaporate the alcohol; and
polymerizing a monomer on the carbon nanotube sheet from which the alcohol has been evaporated, into the conducting polymer by vapor phase polymerization.

15. The method according to claim 14, wherein the hybrid nanomembrane is twisted by attaching the hybrid nanomembrane to a substrate, attaching one end of the hybrid nanomembrane to a motor shaft, and rotating the motor shaft.

16. The method according to claim 14, wherein the carbon nanotube sheet is a densified sheet formed by evaporating the alcohol from a carbon nanotube aerogel sheet.

17. The method according to claim 14, wherein the monomer is an ethylenedioxythiophene (EDOT) monomer.

* * * * *